United States Patent [19]

Brie et al.

[11] Patent Number: 4,571,465
[45] Date of Patent: Feb. 18, 1986

[54] ECHO CANCELLER FOR A BASEBAND DATA SIGNAL

[75] Inventors: Richard Brie, Paris; Loic B. Y. Guidoux, Garancieres, both of France

[73] Assignee: Radioelectriques et Telecommunications, Paris, France

[21] Appl. No.: 539,584

[22] Filed: Oct. 6, 1983

[30] Foreign Application Priority Data

Oct. 11, 1982 [FR] France ............................... 82 16998

[51] Int. Cl.⁴ ............................................... H04B 3/20
[52] U.S. Cl. ................................ 179/170.2; 179/170.6
[58] Field of Search ................ 179/170.2, 170.6, 170.8

[56] References Cited

U.S. PATENT DOCUMENTS

| 3,821,493 | 6/1974 | Chiba | 179/170.2 |
| 4,007,341 | 2/1977 | Sourgens et al. | 179/170.2 |
| 4,479,036 | 10/1984 | Yomamoto et al. | 179/170.2 |

FOREIGN PATENT DOCUMENTS

| 0048515 | 3/1982 | European Pat. Off. | 179/170.2 |
| 2045585 | 10/1980 | United Kingdom | 179/170.2 |
| 2075313 | 11/1981 | United Kingdom | 179/170.2 |

Primary Examiner—Gene Z. Rubinson
Assistant Examiner—R. Vaas
Attorney, Agent, or Firm—William J. Streeter; Leroy Eason

[57] ABSTRACT

An echo canceller used in a data transmission modem for cancelling in the baseband signal of the receive path an echo signal ϵ(t) produced by the data signal from the transmit path. The echo canceller comprises a difference circuit for forming the difference between the signal from the receive path s(t)+ϵ(t) and a synthetic echo copy signal ê(t). The echo copy signal is formed by at least one transversal filter which operates at a sampling frequency equal to the frequency of the data and whose coefficients are adjusted to minimize the mean-square value of an error signal. This error signal e(n) at an actual sampling instant n of the filter is determined by forming the difference between the value of the output signal of the difference circuit at the instant n and the value of this signal at the preceding sampling instant (n−1), which has been multiplied by the ratio between the value of the data recovered at the instant n and the value of the data recovered at the instant (n−1). Also provided is a circuit for providing an error signal for controlling the filter coefficients as a function of the sign of the difference circuit out signals for the actual and previous sampling instants.

11 Claims, 7 Drawing Figures

ECHO CANCELLER FOR A BASEBAND DATA SIGNAL

The invention relates to an echo canceller, used in a data transmission modem for cancelling in the baseband signal of the receive path, an echo signal produced by the data signal of the transmit path. This echo canceller comprises a difference circuit for forming a difference signal between the signal of the receive path and a echo copy signal. The difference signal is applied to a decision circuit recovering the data signal. The echo copy signal is formed at a sampling frequency $F_e$, which is at least equal to the frequency $1/T$ of the data of the transmit path, with the aid of an adjustable digital processing arrangement. The digital processing arrangement is connected to the transmit path and comprises at least one transversal filter operative at sampling instants of frequency $1/T$ and having coefficients which are adjusted to minimize a predetermined function of an error signal.

Echo cancellers are used in modems whose one-way transmit and receive paths are coupled by a coupling circuit in a manner such that the modems have a two-wire access to the exterior. It is known that when a link is formed between two modems via their two-wire accesses, an unwanted echo signal may be produced in the receive path of a modem, which echo signal is created by the signal in the transmit path of the same modem and is due to imperfections of its coupling circuit and/or signal reflections in the link. An echo canceller has for its object to cancel automatically this unwanted echo signal which in the receive path of a local modem is superposed on the useful signal originating from the remote modem, in the case of full duplex transmission.

Obviously, baseband echo cancellers are directly utilized in baseband data transmission modems. But it is alternatively possible to use baseband echo cancellers in data transmission modems employing carrier modulation, by having these echo cancellers act on the baseband signals obtained in the receiver by demodulation of the received signal.

To demonstrate certain problems which may be encountered in an echo canceller of the above-mentioned type, its mode of operation will be briefly described. It is sufficient to consider the case in which the adjustable digital processing arrangement is constituted by a single transversal filter operating at the sampling instants having the frequency $1/T$ of the data, so that the sampling frequency $F_e$ in the echo canceller is equal to this frequency $1/T$. This digital transversal filter processes the data signal of the transmit path at sampling instants of frequency $1/T$ and its coefficients must be adjusted such as to ensure that at the sampling instants it produces a signal commonly referred to as echo copy signal, which simulates the echo signal appearing in the receive path. This digital echo copy signal is converted into the analog form and applied thereafter to a difference circuit to be subtracted from the signal in the receive path with the object of forming a signal in which the echo signal is eliminated. The criterion employed for adjusting the coefficients of the transversal filter is minimizing a predetermined function (generally the mean-square value) of an error signal. This error signal must be characteristic of the echo signal when the echo canceller is made operative or of the residual echo signal (the difference between the echo signal and the echo copy signal) during the convergence of the echo canceller. This echo signal or residual echo signal is present in the output signal of the difference circuit.

In prior art echo cancellers, the error signal converted into digital form for adjusting the coefficients of the transversal filter is formed by the output signal of the difference circuit. Thus, in such an error signal, the received useful data signal is superposed on the residual echo signal and its relative level becomes increasingly larger during the convergence. This may cause a problem which is related to converters converting the error signal into digital form and which may cause the convergence of the echo canceller to stop in the case of a relatively high residual echo signal.

This problem is encountered when, to convert the error signal into digital form, one wants to employ a less accurate analog-to-digital converter in order to reduce the costs. If the simplest version of converter is used which consists of a simple sign detector for the error signal and consequently produces a one-bit digital signal, it may happen that at the sampling instants of the error signal the received useful data signal has an amplitude which is higher than the amplitude of the residual error signal, so that at these instants the sign of the error signal is not representative of the residual echo signal. This deficiency has a particularly serious consequence in homochronous data transmission systems, in which sampling of the error signal is effected by means of a local clock in synchronism with the received data. In these homochronous systems, sampling of the error signal can be permanently effected at instants at which the received useful signal has a high value. In that case, the convergence of the echo canceller may commence when, at the sampling instants, the echo signal has an amplitude which is higher than the amplitude of the received useful signal, but this convergence stops when, at these sampling instants, the residual echo signal reaches substantially the high level of the received useful signal.

To obviate this drawback, while conserving the simplicity of a one-bit converter, one solution described in detail in U.S. Pat. No. 4,334,128 consists of combining with the output signal of the difference circuit a periodical auxiliary signal having a frequency which is not harmonically related to the frequency $1/T$ of the data, having substantially the same level and being wholly uncorrelated to the useful received data signal. By using the sign of the combination signal thus formed to provide the digital one-bit signal used to adjust the coefficients, it is possible to obtain the convergence of the echo canceller in a homochronous system.

Another solution described in published French Patent Application No. 80 20 251 (PHF 80-574) consists in making an estimate of the level of the received useful signal and by comparing at the sampling instants the output signal of the difference circuit with two thresholds, positive and negative. Depending on this level, the error is considered to have zero value when the output signal is located between these levels, and as being positive or negative depending on whether the output signal has a higher absolute value than the positive threshold or the negative threshold. With this solution the digital signal representative of the error signal and used to adjust the coefficients is formed of two bits and the echo canceller can converge to a very reduced value of the residual echo signal.

The present invention provides another very simple solution of the same problem, by using for the adjustment of the coefficients an error signal which is formed in a totally different manner in which it is not necessary to use an auxiliary signal and which enables the convergence utilizing only the sign of this error signal.

SUMMARY OF THE INVENTION

According to the invention, in a baseband echo canceller comprising at least one transversal filter with adjustable coefficients, the error signal used to modify the coefficients of each transversal filter is determined at an actual sampling instant by forming the difference between the value of the output signal of said difference circuit at that sampling instant and the value of the output signal of the difference circuit at a previous sampling instant. The value of the output signal at the previous sampling instant is previously multiplied by the ratio between the value of the recovered data signal at the actual sampling instant and the value of the recovered data signal at the previous sampling instant. The modification of the coefficient is effected or not effected depending on whether the two values of the recovered data signal differ from zero or at least one of these two values is equal to zero.

Using the echo canceller according to the invention, it is possible to cancel an echo signal which superposes itself on a received data signal, when this received data signal results from a multi-level data signal at the transmitter end. This can be a two-level data signal or a three-level data signal obtained by the pseudo-ternary encoding of two-level data.

In the case of transmitted two-level data or three-level data resulting from a pseudo-ternary encoding, the decision circuit can recover a data signal having a positive and a negative level, and the error signal e(n) for each transversal filter can be formed as the difference or the sum of the values of the output signal of the difference circuit at the actual sampling instant of the filter and at a previous sampling instant, depending on whether the values of the recovered data signal at the actual sampling instant and at the preceding sampling instant have the same sign or different signs.

A particularly simple embodiment of the echo canceller according to the invention is obtained when for the adjustment of the coefficients of each transversal filter the signal Sgn[e(n)] is used which characterizes the sign of the error signal e(n), formed, for example, as described in the foregoing for the case of two-level data or pseudo-ternary data.

The utilization of the error signal e(n) formed according to the invention is appropriate when the echo signal has approximately a lower level than the received useful data signal. When there is a risk that the echo signal has a higher level than the received useful signal, which may, for example, be the case with a long transmission line, it is advantageous to use for the adjustment of the coefficients of each transversal filter a signal E(n) having zero value when the sign of the error signal characterized by Sgn[e(n)] and the sign of the output signal of the difference circuit are different, and a value equal to +1 or −1 when these two signs are simultaneously positive or negative. Thus, in an initial phase of the convergence of the echo canceller, the echo signal is significantly reduced to the level of the received useful signal with the aid of the signal formed by the sign of the output signal of the difference circuit, while in the final phase the residual echo signal is reduced to a value which is almost zero by means of the signal Sgn[e(n)] formed in accordance with the invention.

How the invention may be implemented will be more fully appreciated from the following description given by way of example with reference to the accompanying drawings.

DESCRIPTION OF THE PREFERRED EMBODIMENT

Figure 1:
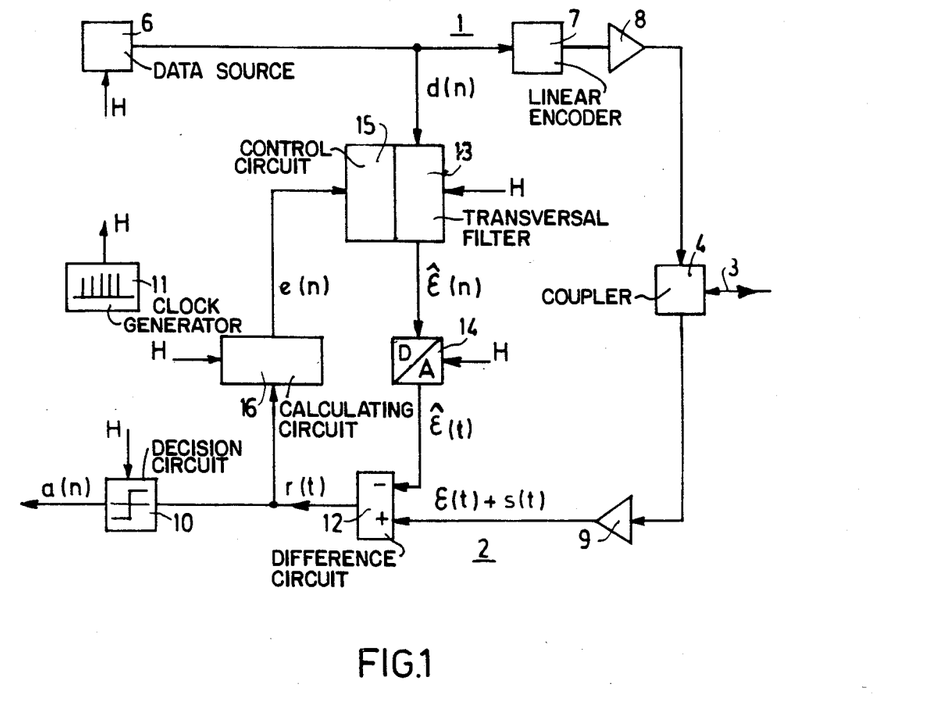
FIG. 1 shows the structure of an echo canceller having a transversal filter included in a data transmission modem and to which the invention applies.

FIG. 1 shows the structure of an echo canceller incorporated in a baseband data transmission modem and to which the invention applies. This modem comprises a one-way transmit path 1 and a one-way receive path 2 which are coupled to a two-way transmission line 3 by means of a hybrid coupling circuit 4.

The transmit path 1 is connected to a data source 6 producing data at a frequency 1/T. These data may have two or more levels such as pseudo-ternary codes. In the example shown, the data from source 6 are applied to a linear encoder 7 which produces an encoded signal with a spectrum which is more suitable for transmission than the initial data signal. For the case of a two-level initial data signal it is, for example, possible to effect a biphase encoding, with an encoded signal keeping two levels. It is alternatively possible to effect what is commonly referred to as a pseudo-ternary encoding, with an encoded signal having three possible levels including the zero level. The encoded data signal is amplified in a transmit amplifier 8 before it is applied to the transmit port of coupling circuit 4. The data signal processed in transmit path 1 is transmitted to the remote modem, not shown, through transmission line 3.

The data signal which is transmitted in the same way by the remote modem is received in the local modem shown in FIG. 1 and is conveyed by coupling circuit 4 to the input of receive path 2 of this modem. In this receive path, the received signal is first amplified in a receive amplifier 9 and thereafter conveyed to a decision circuit 10. The received signal is sampled and produces a data signal for further processing in further portions, not shown, of the receiver. If the data produced by the data source of the remote transmitter are of the two-level or the multi-level types and if they are not encoded otherwise, decision circuit 10 recovers the same data signal when the echo canceller has converged. If the two-level data produced by the source of the remote transmitter are submitted to biphase encoding, decision circuit 10 recovers these biphase encoded data with two levels. If the two-level data from the source of the remote transmitter are subjected to pseudo-ternary encoding, decision circuit 10 recovers the initial two-level data. Thus, decision circuit 10 always recovers a two-level data signal or a multi-level signal.

The sampling pulses used in the receiver and more specifically in decision circuit 10 to sample the received signal are produced by a clock generator 11. This generator produces a clock signal H having a frequency 1/T which is synchronized by known means with the signal having the frequency 1/T and used in the remote modem for transmitting the data. In the homochronous transmission system shown in FIG. 1, the clock signal H produced by generator 11 thus synchronized is also used to transmit data from data source 6 of the local modem.

When a data signal originating from transmit path 1 of the local modem is applied to the transmit port of coupling circuit 4, there appears at the output of amplifier 9 of the receive path an echo signal $\epsilon(t)$ which is due to an unavoidable imbalance of the coupling circuit and/or impedance discontinuities in transmission line 3 which give rise to signal reflections. At the output of amplifier 9 this parasitic echo signal $\epsilon(t)$ is superposed on the useful data signal s(t) originating from the remote modem and may prevent the correct recovery of the data in the receiver.

The echo canceller has for its object to cancel this echo signal $\epsilon(t)$ and comprises a difference circuit 12 which at its (+) input receives the signal $\epsilon(t)+s(t)$ occurring in the receive path and at its (−) input an echo copy signal $\hat{\epsilon}(t)$ so as to form a difference signal r(t) such that:

$$r(t) = s(t) + [\epsilon(t) - \hat{\epsilon}(t)] \quad (1)$$

The portion $[\epsilon(t) - \hat{\epsilon}(t)]$ of this difference signal is the residual echo signal which is substantially zero when the convergence of the echo canceller has been achieved.

In order to obtain this result, the echo canceller comprises an adjustable digital processing arrangement 13 which receives the signal produced by data source 6. It must be adjusted to produce at the sampling instants an echo copy signal allowing the cancellation of the echo signal in the difference signal r(t). FIG. 1 shows a processing arrangement formed by a single digital transversal filter 13 which is operative at the sampling instants having the frequency 1/T of the data supplied by data source 6. At these instants nT characterized by the integer n, this filter 13 produces the digital echo copy signal $\hat{\epsilon}(n)$. It should be noted here that such a transversal filter operating at the frequency 1/T of the data is the basic circuit used in a processing arrangement operating at a sampling frequency $F_e$ which is a multiple of the frequency 1/T of the data.

The samples of the data applied at the instants n to the input of the transversal filter 13 are denoted by d(n). This transversal filter is arranged in the usual way to store at each instant n, N samples d(n−i) applied to its input (i is an integer from 0 to N−1), and to calculate the samples of the echo copy signal $\hat{\epsilon}(n)$ in accordance with the expression:

$$\hat{\epsilon}(n) = \sum_{i=0}^{N-1} C_i \cdot d(n-i) \quad (2)$$

$C_i$ representing the coefficients of the filter.

The digital echo copy signal thus calculated is applied to a digital-to-analog converter 14 which produces the analog signal $\hat{\epsilon}(t)$ applied to the (−) input of the difference circuit 12.

The coefficients $C_i$ of the transversal filter are adjustable and are adjusted in a control circuit 15 so as to minimize a predetermined function of an error signal e(n) which is in digital form, at instants n, in a calculating circuit 16 and which must be characteristic of the echo signal or of the residual echo signal present in the difference signal r(t). The mode of calculating this error signal e(n) will be described in greater detail. Generally, the coefficients $C_i$ of filter 13 are adjusted so as to minimize the mean-square value of the error signal e(n), i.e. $E[|e(n)|]^2$. In this case, using the gradient algorithm, the coefficients $C_i$ are adjusted iteratively in accordance with the recursion formula:

$$C_i(n+1) = C_i(n) + \alpha \cdot E[d(n-i) \cdot e(n)] \quad (3)$$

$\alpha$ being a coefficient less than 1.

In practice, to avoid the necessity to calculate an average value, which operation is indicated by the operator E, preference is given to the recursion formula:

$$C_i(n+1) = C_i(n) + \beta \cdot d(n-i) \cdot e(n) \quad (4)$$

In this formula, $\beta$ is a fixed coefficient having a small value with respect to 1 and determining the magnitude of the modifications to be applied to the coefficients $C_i(n)$ at the iteration n, to obtain the coefficients $C_i(n+1)$ at the iteration (n+1).

Minimizing the quantity $E[|e(n)|]^2$ by means of the recursion formulae (3) and (4) must render it possible to obtain the convergence of N coefficients $C_i$ of the transversal filter, towards the N samples $g_i$ of the impulse response of the echo signal path, taken at the reference instant i=0 to the instant i=N−1. For the instants such that i≧N, the samples $g_i$ are assumed to be zero. The samples $\epsilon(n)$ of the echo signal at instants n have the expression:

$$\epsilon(n) = \sum_{i=0}^{N-1} g_i \cdot d(n-i) \quad (5)$$

A mutual comparison of the formulae (2) and (5) shows that when the coefficients $C_i$ of the transversal filter have converged towards the samples $g_i$ of the impulse response, the residual echo signal $\epsilon(n) - \hat{\epsilon}(n)$ at the sampling instants n is cancelled, and that at these instants the difference signal r(n) no longer contains the useful signal s(n).

Figure 2:
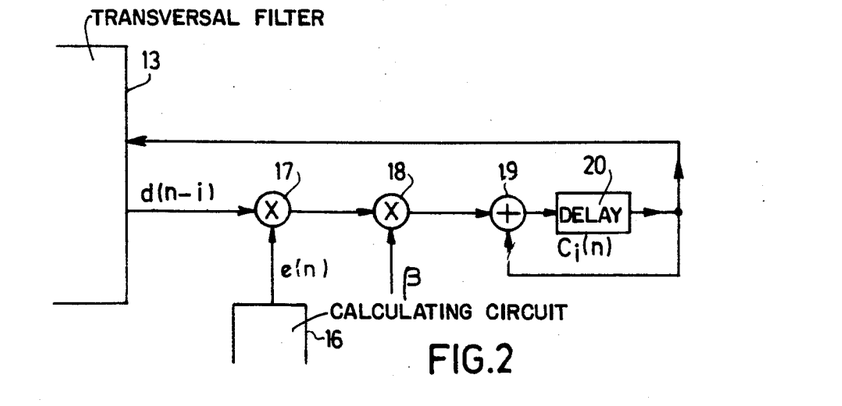
FIG. 2 shows the block diagram of the control circuit for adjusting a coefficient of a transversal filter of the echo canceller.

The practical recursion formula (4) can be put into effect in control circuit 15, in accordance with a diagram shown in FIG. 2 for a coefficient $C_i$. The data signal d(n−i) available in a memory location of transversal filter 13 is applied to a multiplying circuit 17 for multiplication by the error signal e(n) processed in error calculating circuit 16. The product thus formed is applied to a multiplying circuit 18 to be multiplied by the fixed coefficient $\beta$. The modifying term $\beta \cdot d(n-i) \cdot e(n)$ thus formed is applied to an accumulator formed by an adding circuit 19 and a memory 20 producing a delay of one sampling period T. The adding circuit forms the sum of the modifying term calculated at the instant n and the coefficient $C_i(n)$ appearing at instant n at the output of memory 20. This sum which is available at the instant (n+1) at the output of memory 20 forms the coefficient $C_i(n+1)$ to be used at the instant (n+1) in transversal filter 13.

It is also known to use for the adjustment of the coefficients $C_i$ a recursion formula which is simpler to implement than the formula (4), by replacing therein the error signal e(n) by its sign which can be written as Sgn[e(n)]. The recursion formula (4) then becomes:

$$C_i(n+1) = C_i(n) \cdot \beta \cdot d(n-i) \cdot Sgn[e(n)] \quad (6)$$

In known echo cancellers, the error signal e(n) utilized to adjust the coefficients $C_i$ of transversal filter 13 is formed in calculating circuit 16 by the samples r(n), converted into digital form, of the analog signal r(t) supplied by difference circuit 12. For baseband transmission modems transmitting at, for example 80 kbit/s, the conversion rate for forming the digital error signal e(n) may be high and to reduce the cost of this conversion one tries to use only a one-bit converter producing the sign of the samples r(n) of the difference signal r(t). Thus, for modifying the coefficients the recursion formula (6) is applied in which e(n) is replaced by r(n).

However, this method has a drawback which, in certain cases, may stop the convergence of the echo canceller at a high and unacceptable value of the residual echo signal. As a matter of fact, at the sampling instants n the difference signal is written in accordance with the formula (1):

$$r(n) = s(n) + [\epsilon(n) - \hat{\epsilon}(n)]$$

At the instants n the sign of the difference signal r(n) is substantially determined by the larger of the two signals s(n) and $[\epsilon(n) - \hat{\epsilon}(n)]$.

During sampling instants n, the residual echo signal $[\epsilon(n) - \hat{\epsilon}(n)]$ is greater than the received useful signal s(n), the sign of r(n) is characteristic of the residual echo signal and modifying the coefficients can be effected in the correct sense to reduce the residual echo signal. This may, for example, occur with long transmission lines, when the echo canceller is put into operation.

When at the sampling instants n, the residual echo signal $[\epsilon(n) - \hat{\epsilon}(n)]$ is smaller than the received useful signal, the sign of r(n) is not characteristic of the residual echo signal and modifying the coefficients does not necessarily result in a reduction of the residual echo signal. This may, for example, occur with short transmission lines, from the moment the echo canceller is put into operation, or with long transmission lines after the convergence of the echo canceller has started. This disadvantage is particularly serious in homochronous transmission systems in which the transmit and receive clocks are in synchronism. In such a system, the sampling instants n may occur permanently at the instants at which the amplitude of the received useful signal s(n) is greatest. The situation may occur, from the moment the echo canceller is put into opeeration or very rapidly during the convergence, in which the convergence of the echo canceller stops, with a residual echo $[\epsilon(n) - \hat{\epsilon}(n)]$ having an amplitude of the order of magnitude of the greatest amplitude of the received useful signal s(n).

To prevent the received useful signal from influencing the convergence of the echo canceller, the present invention provides a simple solution which is wholly different from those considered in the prior art.

According to the invention, the error signal e(n) employed for the modification of the coefficients of transversal filter 13 at an actual sampling instant n is determined in error calculating circuit 16 by forming the difference between the value r(n) at instant n of signal r(t) originating from difference circuit 12 and the value of this signal r(t) at a sampling instant preceding the instant n. This last value was previously multiplied by the ratio between the value a(n) of the data signal recovered by the decision circuit at the instant n and the value of this data signal recovered at the previous sampling instant. The previous sampling instant under consideration may be the sampling instant (n−1)T which just precedes the instant nT and in that case the error signal e(n) used for the adjustment of the coefficients $g_i$ in the echo canceller according to the invention may be expressed by the formula:

$$e(n) = r(n) - r(n-1) \cdot \frac{a(n)}{a(n-1)} \quad (7)$$

It will be clear that in this formula multiplying the preceding value r(n−1) of the output signal of circuit 12 by the ratio a(n)/[a(n−1)] has for its object to standardize this preceding value relative to the present value r(n), so as to ensure that the difference has always the same significance, independent of the value of the data signal.

When the data signal recovered by decision circuit 10 does not have the zero level, the modifications of the coefficients are effected with the error signal e(n). This is, for example, done for multi-level data without a zero level, for two-level data or for pseudo-ternary encoded data. When the data signal recovered by decision circuit 10 has a zero level, the modifications of the coefficients are effected with the error signal e(n) when the two values of the data signal a(n) and a(n−1) differ from zero and are not effected when at least one of these two values is equal to zero.

Figure 3:
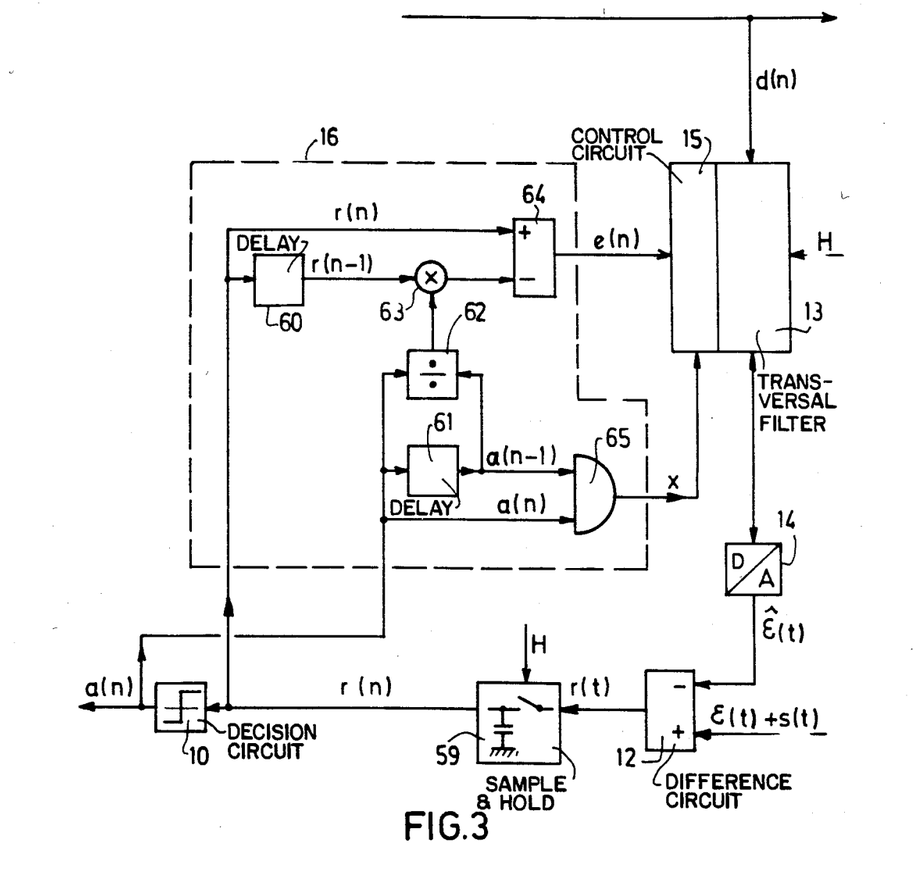
FIG. 3 shows the basic circuit diagram of the echo canceller according to the invention.

Putting the invention into effect can be realized in in accordance with the block diagram of the echo canceller of FIG. 3. In this FIG. 3, elements having the same function as those in FIG. 1 are given the same reference signs. The signal r(t) supplied by difference circuit 12 is sampled by a sample-and-hold circuit 59 which is activated by the signal H having the frequency 1/T. This sampled signal is applied to a delay circuit 60 which produces a time delay equal to a sampling period T, so that at a sampling instant n the values r(n) and r(n−1) of the signal r(t) originating from difference circuit 12 are respectively obtained at the input and at the output of this circuit 60. The data signal recovered by decision circuit 10 is applied to a delay circuit 61 which also produces a time delay equal to a period T, so that at the instant n the values a(n) and a(n−1) of the recovered data signal are respectively obtained at the input and at the output of this delay circuit 61. The ratio a(n)/[a(n−1)] is formed in a circuit 62. A multiplying circuit 63 produces the product r(n−1)·a(n)/[a(n−1)] which is applied to the (−) input of a difference circuit 64. This difference circuit 64 receives at its (+) input the quantity r(n) and also supplies, in accordance with formula (7), the error signal e(n) which is applied to control circuit 15 of the coefficients of transversal filter 13. On the other hand, an AND-gate 65 has its two inputs connected to the input and to the output of delay circuit 61, respectively. The AND-gate 65 produces a logic signal x which enables the modification of the coefficients by the error signal e(n) when the two values a(n) and a(n−1) of the recovered data signal differ from zero and does not allow this modification when at least one of these two values a(n) and a(n−1) is equal to zero. The action of the logic signal x may, for example, be to cancel the modifying term of the coefficients applied to adding circuit 19 (see FIG. 2) when the modification has not been permitted.

In the case in which the data signal transmitted by the remote modem has two levels or three levels resulting from a pseudo-ternary encoding of the two-level data, decision circuit 10 recovers data having a positive and a negative sign of the sampled signal r(t). In this case the error signal e(n) of formula (7) may be written:

$$e(n) = r(n) - r(n-1) \cdot Sgn[r(n)] \cdot Sgn[r(n-1)] \quad (8)$$

It can be derived therefrom that it is thus possible to base the calculation of the error signal e(n) on the relations:

$$\begin{cases} e(n) = r(n) - r(n-1) \text{ if } PS(n) > 0 \\ e(n) = r(n) + r(n-1) \text{ if } PS(n) < 0 \end{cases} \quad (9)$$

where $PS(n) = Sgn[r(n)] \cdot Sgn[r(n-1)]$

It will now be demonstrated that when the coefficients $C_i$ of transversal filter 13 are adjusted in accordance with the recursion formulae (3) or (4) in such a way as to minimize the mean-square value of the error signal e(n) formed according to the invention, these coefficients $C_i$ may converge in conditions which will be described more accurately hereinafter, towards the samples $g_i$ of the impulse response of the echo path. This indicates that the echo signal has been cancelled. To simplify matters, let it be assumed for this demonstration that the data recovered by decision circuit 10 has two levels +1 or −1 supplied by the sign of the sampled signal r(t) and that the error signal may be expressed by formula (8).

Denoting the residual echo signals at the instants n and (n−1) by $r_e(n)$ and $r_e(n-1)$ it can be derived from formula (1) that:

$$\begin{cases} r(n) = s(n) + r_e(n) \\ r(n-1) = s(n-1) + r_e(n-1) \end{cases} \quad (10)$$

where $$\begin{cases} r_e(n) = \epsilon(n) - \hat{\epsilon}(n) \\ r_e(n-1) = \epsilon(n-1) - \hat{\epsilon}(n-1) \end{cases}$$

Let it now be assumed that at the sampling instants the received useful signal s(t) has an amplitude which is greater than the amplitude of the residual echo signal, that is to say:

$$\begin{cases} s(n) > r_e(n) \\ s(n-1) > r_e(n-1) \end{cases} \quad (11)$$

This is, for example, realized from the moment the echo canceller is put into operation for short transmission lines.

When these conditions (11) are realized it can be written that:

$$\begin{cases} Sgn[r(n)] = Sgn[s(n)] \\ Sgn[r(n-1)] = Sgn[s(n-1)] \end{cases} \quad (12)$$

It is now possible to demonstrate, taking account of relations (10) and (12), that expression (9) of the error signal e(n) may be written:

$$e(n) = [|s(n)| - |s(n-1)|] \cdot Sgn[s(n)] + \quad (13)$$
$$r_e(n) - r_e(n-1) \cdot Sgn[s(n)] \cdot Sgn[s(n-1)]$$

Let it now be assumed that the received useful signal s(t) has the same amplitude at the sampling instants n and (n−1), that is to say that:

$$|s(n)| = |s(n-1)| \quad (14)$$

In practice this is realized for, for example, short transmission lines or equalized transmission lines.

Finally, when condition (14) is realized it is derived that the error signal in accordance with formula (13) can be written:

$$e(n) = r_e(n) - r_e(n-1) \cdot Sgn[s(n)] \cdot Sgn[s(n-1)] \quad (15)$$

This formula (15) shows that with the above hypotheses, which find expression in equations (11) and (14), the error signal e(n) depends on the residual echo signal and does not depend anymore on the amplitude of the received useful signal, but only on the sign of this signal at the sampling instants n and (n−1).

The convergence of the echo canceller according to the invention which, for the adjustment of the coefficients $C_i$ of the transversal filter, uses the error signal e(n) in accordance with formula (15) will now be demonstrated.

It is easy to derive from formulae (2) and (5) the expressions of the residual echo signal $r_e(n)$ and $r_e(n-1)$ at the instants n and (n−1):

$$\begin{cases} r_e(n) = \sum_{i=0}^{N-1} (g_i - C_i) \cdot d(n-i) \\ r_e(n-1) = \sum_{i=0}^{N-1} (g_i - C_i) \cdot d(n-i-1) \end{cases} \quad (16)$$

To simplify the notation, a vectorial notation will be used assuming for the respective transposes of the vectors $\vec{g}$, $\vec{C}(n)$, $\vec{D}(n)$ and $\vec{D}(n-1)$ that:

$$\underline{g} = [g_0 \ldots g_{N-1}]$$

$$\underline{C}(n) = [C_0(n), C_1(n), \ldots C_{N-1}(n)]$$

$$\underline{D}(n) = [d(n), d(n-1), \ldots d(n-N+1)]$$

$$\underline{D}(n-1) = [d(n-1), d(n-2), \ldots d(n-N)]$$

Taking account of formulae (16), the error signal e(n) in accordance with formula (15) can be written in vectorial notation:

$$e(n) = \underline{D}(n) [\vec{g} - \vec{C}(n)] - \underline{D}(n-1)[\vec{g} - \vec{C}(n)] \cdot \quad (17)$$
$$Sgn[s(n)] \cdot Sgn[s(n-1)]$$

On the other hand, recursion formula (3) used for adjusting the coefficients is written in vectorial notation:

$$\vec{C}(n+1) = \vec{C}(n) + \alpha E[\vec{D}(n) \cdot e(n)] \quad (18)$$

Using expression (17) of e(n), it is obtained for the average value $E[\vec{D}(n) \cdot e(n)]$ occurring in formula (18):

$$E[\vec{D}(n) \cdot e(n)] = [\vec{g} - \vec{C}(n)] \cdot E[\vec{D}(n) \cdot \vec{D}(n)] -$$
$$[\vec{g} - \vec{C}(n)] \cdot E[\vec{D}(n) \cdot \vec{D}(n-1) \cdot Sgn[s(n)] \cdot Sgn[s(n-1)]]$$

In this expression of $E[\vec{D}(n) \cdot e(n)]$, the second term is equal to zero. In fact, the locally transmitted data, forming the components of the matrix $\vec{D}(n) \cdot \vec{D}(n-1)$, are statistically independent of the received data $s(n)$ and $s(n-1)$, so that all these components, multiplied by $Sgn[s(n)] \cdot Sgn[s(n-1)]$ have an average value zero. As the locally transmitted data are themselves statistically independent, it can be demonstrated that the matrix $E[\vec{D}(n) \cdot \vec{D}(n)]$ may be written as $II\sigma^2$, $II$ being the identity matrix and $\sigma^2$ being a factor characterizing the power of the data. In these circumstances, recursion formula (18) may be written:

$$\vec{C}(n+1) = \vec{C}(n) + \alpha[\vec{g} - \vec{C}(n)]\sigma^2$$

Because of the classical form of this recursion formula it is possible to write when n tends to infinity:

$$\vec{C}(n) = [1 - \alpha\sigma^2]^n + \vec{g}$$

When a coefficient is chosen which is sufficiently small such that $\alpha\sigma^2 < 1$, it is obtained in practice for a sufficiently high number n of iterations that $\vec{C}(n) = \vec{g}$, which proves that the echo canceller has converged.

When conditions of equations (11) and (14) are satisfied, it is possible to use for the adjustment of the coefficients of the transversal filter instead of the error signal e(n) formed in the general case with the aid of formula (7) or formed in the case of data recovered with two levels with the aid of formulae (8) or (9), the sign of this error signal, i.e. $Sgn[e(n)]$.

Figure 4:
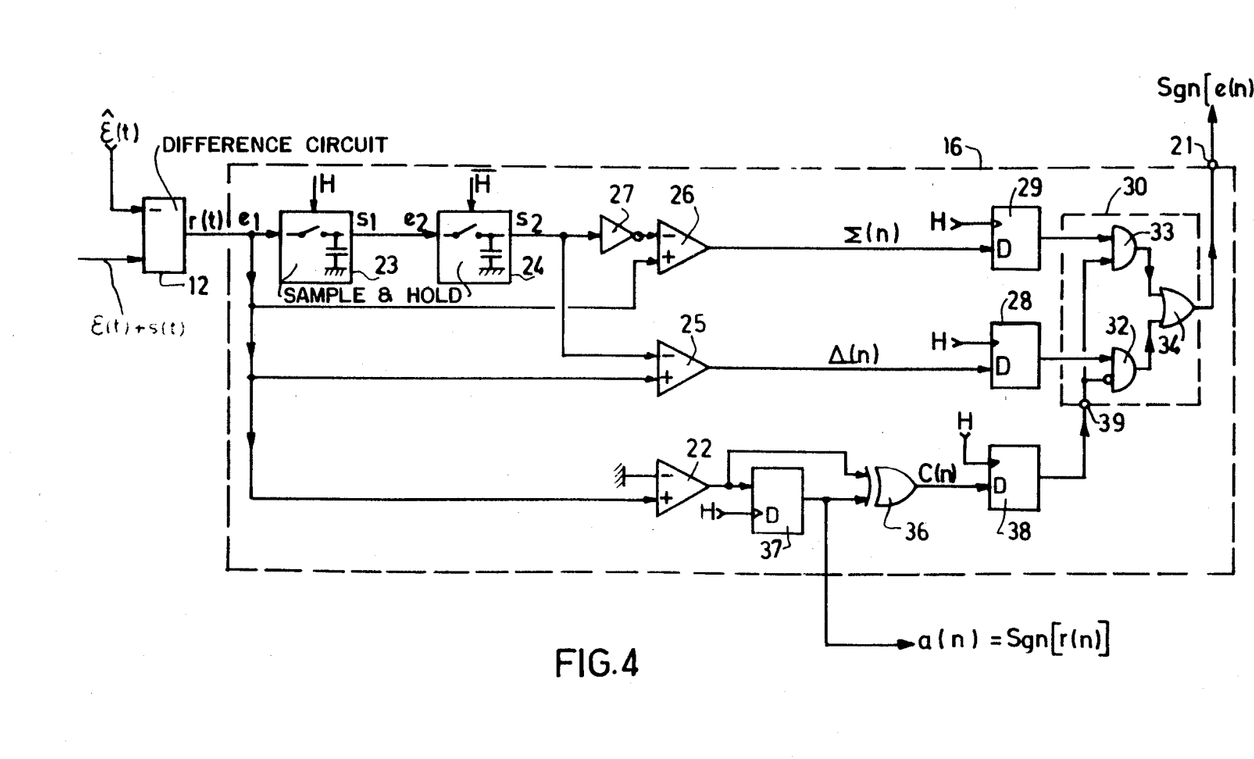
FIG. 4 shows the circuit diagram of an embodiment of the circuit for calculating the signal Sgn[e(n)] which characterizes the sign of the error signal e(n) for the case of a two-level recovered data signal.

FIG. 4 shows a specific embodiment of calculating circuit 16 producing the signal $Sgn[e(n)]$, for the case in which the data signal recovered by the decision circuit has a positive and a negative level, constituted by the sign of the signal r(t). Describing the quantities $Sgn[e(n)]$ in this circuit 16 is based on the following relations, which are directly derived from the relations (9):

$$\begin{cases} Sgn[e(n)] = Sgn[r(n) - r(n-1)] \text{ if } PS(n) > 0 \\ Sgn[e(n)] = Sgn[r(n) + r(n-1)] \text{ if } PS(n) < 0 \end{cases} \quad (19)$$

where $PS(n) = Sgn[r(n)] \cdot Sgn[r(n-1)]$

In FIG. 4, elements having the same functions as those shown in FIG. 1 are given the same reference signs. In FIG. 4, difference circuit 12 receives at its (+) input the signal from the receive path $\epsilon(t) + s(t)$ and at its (−) input the echo copy signal converted into the analog form $\hat{\epsilon}(t)$. The difference signal r(t) supplied by circuit 12 is processed in calculating circuit 16, in which it is more specifically applied to the cascade arrangement of two sample-and-hold circuits 23 and 24. The first circuit 23 is activated by the clock signal H which has the frequency 1/T and the second circuit 24 is activated by the complementary signal $\bar{H}$. The mode of operation of this cascade arrangement 23, 24 will be described in detail with reference to FIG. 5. The diagram 5a represents the clock signal H having ascending edges produced at the instant $(n-2)$, $(n-1)$ and n. The diagram 5b represents the signal $\bar{H}$. The diagram 5c represents the analog difference signal r(t) which is applied to input $e_1$ of circuit 23 and has the values $r(n-2)$, $r(n-1)$, $r(n)$ at the instants $(n-2)$, $(n-1)$, n. Let it be assumed that sampling circuits 23 and 24 are conductive when their control signals H and $\bar{H}$ are in the low state and non-conductive when these signals are in the high state. The shape of the signal at output $s_1$ of circuit 23 (that is to say at input $e_2$ of circuit 24), such as it is shown in diagram 5d, can be derived therefrom. Finally, the shape of the signal at output $s_2$ of circuit 24, shown in diagram 5e is derived from diagram 5d, taking account of a certain signal settling time when circuit 24 becomes conductive. The diagrams of FIG. 5 clearly show that just before an ascending edge of clock signal H, for example the edge produced at the instant n, the signal at input $e_1$ of circuit 23 has the value $r(n)$ and the signal at output $s_2$ of circuit 24 has the value $r(n-1)$.

In circuit 16, the difference signal r(t) is applied to the (+) input of two comparator circuits 25 and 26. The signal obtained at the output of circuit 24 is applied directly to the (−) input of comparator circuit 25 and, through an inverting amplifier 27, to the (−) input of comparator circuit 26.

Thus, there is obtained at the output of comparator 25 just before the rising edge of clock signal H at the instant n, a logic signal $\Delta(n)$ having the values:

$\Delta(n) = 1$ if $r(n) - r(n-1) > 0$ and $\Delta(n) = 0$ if $r(n) - r(n-1) < 0$ A logic signal $\Sigma(n)$ having the values:

$\Sigma(n) = 1$ if $r(n) + r(n+1) > 0$ $\Sigma(n) = 0$ if $r(n) + r(n+1) < 0$ is obtained at the same instant at the output of comparator 26.

When the logic values 1 and 0 represent the signs + and −, respectively, the signal $\Delta(n)$ and $\Sigma(n)$ adequately represent the quantities $Sgn[r(n) - r(n-1)]$ and $Sgn[r(n) + r(n-1)]$ necessary in accordance with formulae (19) to obtain the quantity $Sgn[e(n)]$.

The signals $\Delta(n)$ and $\Sigma(n)$ thus formed are applied to the D-input of flip-flops 28 and 29, to be sampled on the ascending edges of clock ignal H. The sampled signals $\Delta(n)$ and $\Sigma(n)$ are applied to a switch 30 which is instructed, by applying formulae (19), to forward either signal $\Delta(n)$ or signal $\Sigma(n)$ to output 21 of calculating circuit 16, depending on whether quantity PS(n) is positive or negative to output 21 of calculating circuit 16. Switch 30 is formed in the usual way by means of an AND-gate 32 having an inverting input, an AND-gate 33 and an OR-gate 34, arranged as shown in the FIG. 4. The switch is controlled by a logic control signal which appears at its control terminal 39 and is representative of quantity PS(n). This control signal is formed in the following way. The difference signal r(t) is applied to the (+) input of a comparator circuit 22 whose (−)

input is at the zero volt ground potential. The output signal of comparator circuit 22 which thus represents the quantity Sgn[r(t)] is applied simultaneously to a first input of an Exclusive-OR-gate 36 and to the D-input D of a flip-flop 37 to be sampled on the ascending edges of clock signal H. The output of flip-flop 37 is connected to the second input of Exclusive-OR-gate 36. At the instant n of an ascending edge of clock signal H, the first input of Exclusive-OR-gate 36 receives the quantity Sgn[r(n)], while its second input receives the quantity Sgn[r(n−1)] stored in flip-flop 37 at the preceding instant (n−1). It should be noted that comparator circuit 22 and associated flip-flop "performs the part of the decision circuit denoted by reference numeral 10 in the FIGS. 1 and 3. The output of flip-flop 37 may be used to recover the data signal a(n)=Sgn[r(n)]. Thus, a signal C(n) having the value 1 when quantity PS(n)=Sgn[r(n)]. Sgn[r(n−1)] is negative and the value 0 when quantity PS(n) is positive, is obtained at the output of Exclusive-OR-gate 36. The signal C(n) is applied to the D-input of a flip-flop 38 to be sampled on the ascending edges of clock signal H. The output of flip-flop 38 supplies the control signal for switch 30. It will be clear from the circuit diagram of this switch that, depending on whether C(n)=1 (that is to say PS(n)<0) or C(n)=0 (that is to say PS(n)>0), either signal $\Sigma(n)$ or signal $\Delta(n)$ appears at output 21 after the instant n of an ascending edge of the clock signal H. This signal appearing at output 21 is representative of the signal Sgn[e(n)] to be used in control circuit 15 for the coefficient of transversal filter 13.

As has been shown in the foregoing, the use of the error signal e(n) formed according to the invention in accordance with formula (7), or of the sign Sgn[e(n)] of this error signal, allows the convergence of the echo canceller when conditions (11) and (14) are verified, which is, for example, the case for short and properly equalized transmission lines from the instant that the echo canceller has been put into operation. In contrast, it can be shown that the use of this error signal e(n), or of its sign Sgn[e(n)], for the adjustment of the coefficients does not allow a convergence resulting in the cancellation of the echo when conditions (11) and (14) are not verified, which is, for example, the case for long or poorly equalized transmission lines.

For a long transmission line, the echo signal $\epsilon(t)$ has a high level relative to the level of the received useful signal s(t) when the echo canceller is put into operation. Now, as explained in the foregoing, a prior art echo canceller using as error signal the sign of the difference signal r(t), that is to say the quantities Sgn[r(n)] at the sampling instants n, permits reducing the initial high-level echo signal for a long line down to a level of the residual echo signal having the order of magnitude of the received useful signal. On the other hand, if the long transmission line is poorly equalized, the amplitude of the received signal s(t) is variable at the sampling instants, even in a homochronous transmission system, which contributes to a certain reduction of the level of the residual echo signal with a prior art echo canceller.

Since the use of the sign of the difference signal r(t) renders it possible to bring a high-level echo signal down to the level of the received useful signal and since the use of the sign of the error signal e(n) determined according to the invention renders it possible to bring a residual echo signal having substantially the level of the useful receiving signal down to a level which is substantially zero, a variant of the invention then consists in the joint usage of the sign of the difference signal r(t) and the sign of the error signal e(n) to form a signal E(n) utilized as an error signal for adjusting the coefficients.

In accordance with this variant, this 2-bit signal E(n) may take 3 values: the value +1 or −1 depending on whether the quantities Sgn[r(n)] and Sgn[e(n)] have the same value equal to +1 or −1, and the vaue 0 if the quantities Sgn[r(n)] and Sgn[e(n)] have different values. This signal E(n) is used to modify the value of the coefficients $C_i$ of transversal filter 13, in accordance with a recursion formula similar to formula (14), that is to say:

$$C_i(n+1) = C_i(n) + \beta \cdot d(n-i) \cdot E(n)$$

It can be seen that when the quantities Sgn[r(n)] and Sgn[e(n)] have the same values, the coefficients are modified in correspondence with this common value. When these quantities have different values the coefficients are not modified.

In practice, this variant of the invention using such a signal E(n) renders it possible to obtain the convergence of the echo canceller in the difficult case of homochronous transmission systems for transmission lines which are equalized or non-equalized and have any length whatsoever. In fact, whatever the case, one of the quantities Sgn[r(n)] or Sgn[e(n)] used to form the signal E(n) takes indeed successively the correct values which enable the modification of the coefficients in the direction of the convergence, while the other quantity assumes, at least now and then, the same correct values.

Figure 6:
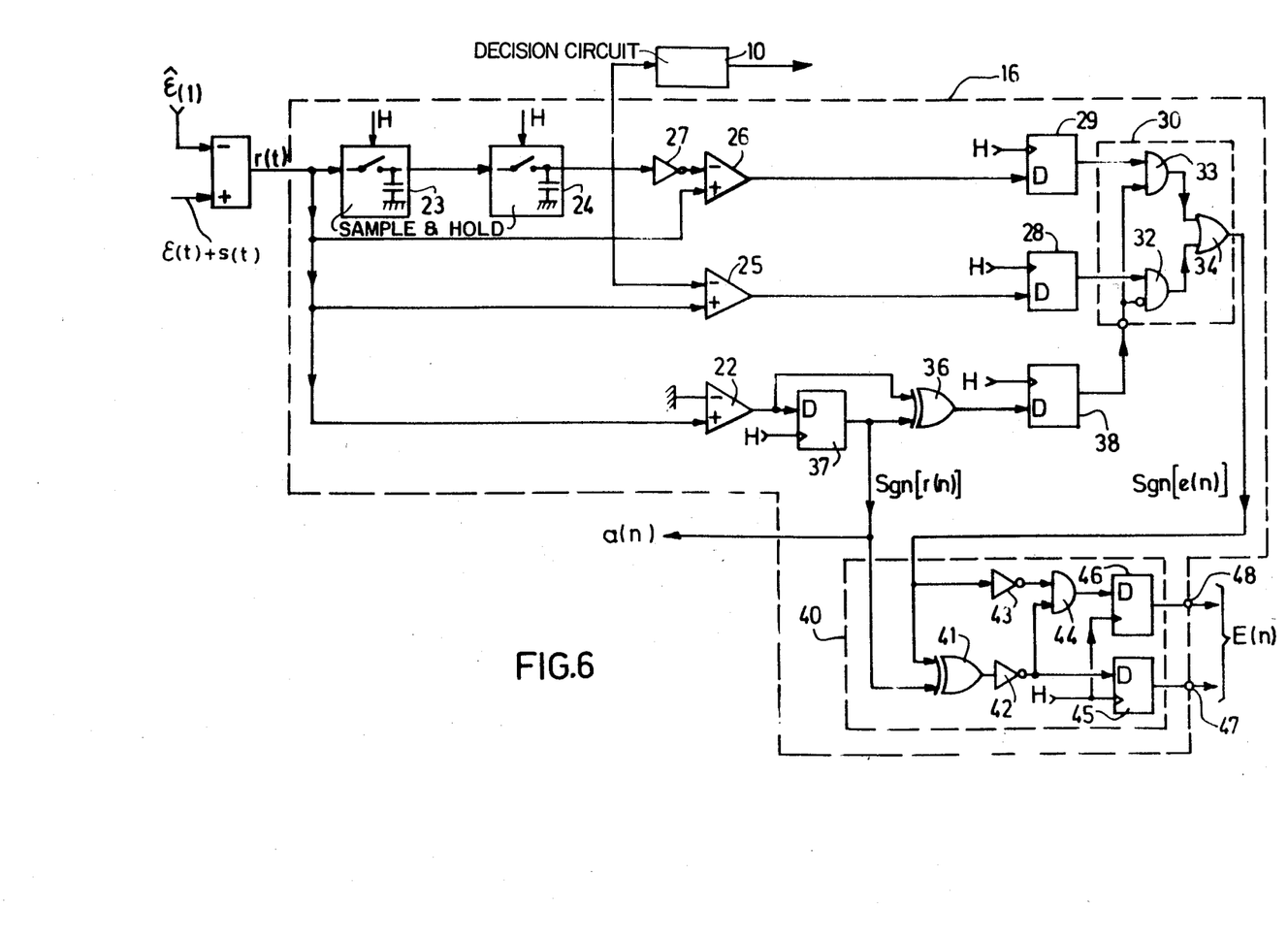
FIG. 6 shows the circuit diagram of an embodiment of a circuit for calculating the signal E(n) for the case of a two-level recovered data signal.

FIG. 6 shows an embodiment of circuit 16 for calculating the signal E(n). Circuit 16 of FIG. 6 comprises all the elements of circuit 16 shown in FIG. 4, which are given the reference numerals 22 to 38 and are arranged in the same way. Circuit 16 of FIG. 6 comprises in addition a logic circuit 40 which uses the signal Sgn[r(n)] formed at the output of flip-flop 37 and the signal Sgn[e(n)] formed at the output of switch 30. Logic circuit 40 is arranged to form, from the logic signals Sgn[e(n)] and Sgn[r(n)], the signal E(n) expressed in the two's complement code, which is the most practical code for effecting the additions and subtractiond necessary for adjusting the coefficients. The truth table shown in the following Table I describes the function of logic circuit 40.

TABLE I

| | | E(n) | |
|---|---|---|---|
| Sgn[e(n)] | Sgn[r(n)] | LSB | MSBS |
| 1 | 1 | 1 | 0 |
| 1 | 0 | 0 | 0 |
| 0 | 1 | 0 | 0 |
| 0 | 0 | 1 | 1 |

The first two columns of Table I indicate together the four possible configurations for the set of the two signals Sgn[e(n)] and Sgn[r(n)]. A logic signal "1" corresponds to a (+) sign for each of these two signals and a logic signal "0" corresponds to a (−) sign. The third and fourth columns indicate, with respect to these four configurations, the values of the bits to be obtained for forming the signal E(n) in the two's complement code, in conformity with the definition of the signal E(n). The third column with the heading LSB furnishes the least significant bit of the signal E(n), the fourth column with the heading MSBS furnishes the other bits of the signal E(n).

Figure 5:
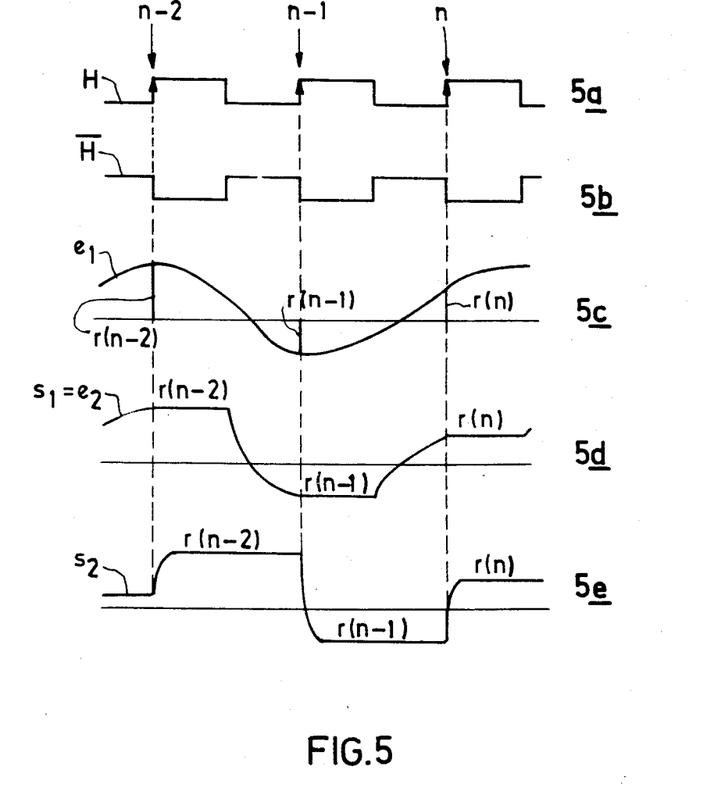
FIG. 5 shows signal diagrams intended to explain how the circuit of FIG. 4 functions.

It can be easily seen that the truth table of Table I is realized with circuit 40 having the structure as shown in FIG. 5. The signals Sgn[r(n)] and Sgn[e(n)] are applied to the two inputs of an Exclusive-OR-gate 41. The output signal of gate 41 is applied to an inverter 42 which produces the signal LSB which corresponds to the least significant bit of the signal E(n). The signal Sgn[e(n)] is applied to an inverter 43. The output signals of inverters 42 and 43 are applied to an AND-gate 44 which produces the signal MSBS corresponding to the other bits of the signal E(n). The two signals LSB and MSBS are applied to the D-input of two flip-flops 45 and 46 to be sampled on the ascending edges of clock signal H. The outputs of flip-flops 45 and 46 are respectively connected to output terminals 47 and 48 of circuit 16. The signal E(n) expressed in the two's complement code and intended to be used in control circuit 15 for the coefficients of transversal filter 13 appears at the combination of these two output terminals.

In the foregoing and more specifically in the basic circuit diagram of FIG. 1, it was assumed that the sampling frequency in the echo canceller, that is to say the rate at which the samples of the echo copy signal are calculated, is equal to the frequency 1/T of the data signal in the transmission path. In this hypothesis, the digital processing arrangement calculating the echo copy signal is formed, as shown in FIG. 1, by a transversal filter which operates at the frequency 1/T of the data. But generally, the data signal to be transmitted is encoded (for example in biphase code) and transmitted in a frequency band whose maximum frequency is higher than the frequency 1/T of the data; to cancel in the widest possible band the echo produced by the transmitted signal it is necessary that in the echo canceller the echo copy signal is supplied with a sampling frequency which significantly exceeds the frequency 1/T of the data.

Figure 7:
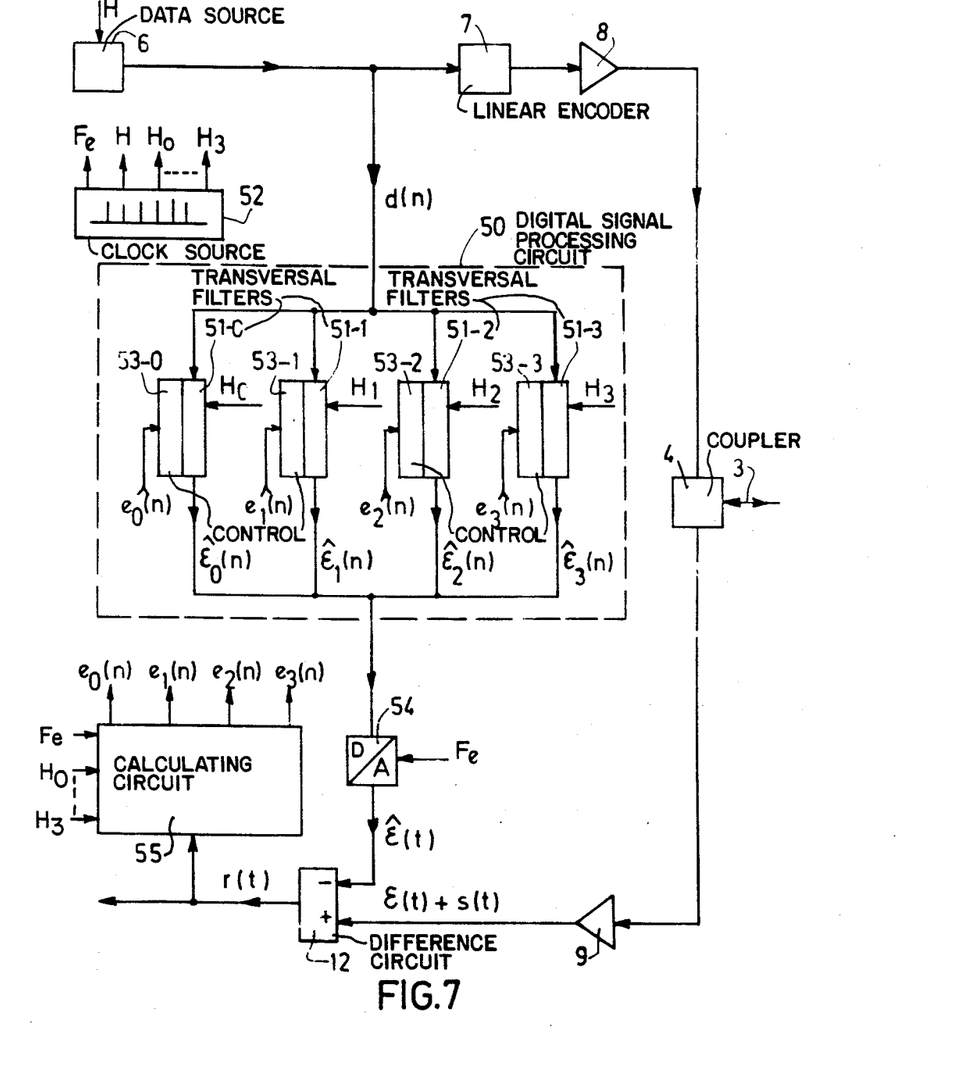
FIG. 7 shows the structure of an echo canceller formed by a plurality of transversal filters and to which the invention applies.

An echo canceller operating with a sampling frequency $F_e$ equal to, for example, 4 times the frequency 1/T of the transmitted data has a construction which is known in itself and which can be represented as shown in FIG. 7. In this echo canceller, the data signal d(n) produced by data source 6 is applied in a digital processing arrangement 50 to 4 transversal filters 51-0, 51-1, 51-2, 51-3. In these filters, the signal d(n) is sampled with the aid of clock signals $H_0$, $H_1$, $H_2$, $H_3$ produced by a clock signal generator 52, having the same frequency 1/T but being shifted relative to each other over a sampling period $T_e$ of the echo canceller. The sampling instants produced by clock signals $H_0$ to $H_3$ are given in the following Table II:

TABLE II

| Clock | Sampling instants |
|---|---|
| $H_0$ | $4nT_e$ |
| $H_1$ | $(4n - 1)T_e$ |
| $H_2$ | $(4n - 2)T_e$ |
| $H_3$ | $(4n - 3)T_e$ |

In each transversal filter 51-0 to 51-3, the samples of the echo copy signals $ê_0(n)$ to $ê_3(n)$ are calculated at the rate 1/T with the aid of the coefficients which are adjusted in control circuits 53-0 to 53-3. The samples of the signals ($ê_0(n)$ to ($ê_3(n)$ shifted relative to each other over the period $T_e$, are multiplexed and applied to the input of a digital-to-analog converter 54 which operates at the sampling frequency $F_e = 4/T$ supplied by clock signal generator 52. The analog echo signal $ê(t)$ is applied, as in the echo canceller of FIG. 1, to difference circuit 12, which produces the difference signal r(t) in which the echo signal $\epsilon(t)$ is cancelled after the convergence of the echo canceller. With a view to adjusting the coefficients of the transversal filters 51-0 to 51-3, the difference signal r(t) is applied to calculating circuit 55 which has for its object to generate the error signals $e_0(n)$ to $e_3(n)$ to be utilized in coefficient control circuits 53-0 to 53-3.

The present invention is applied to this known structure of the echo canceller, to calculate the error signals $e_0(n)$ to $e_3(n)$. These error signals can be calculated in accordance with formulae (7), (8) or (9), by using as the actual sampling instants the instants indicated in Table II and as the previous sampling instants the instants separated from the first sampling instants by the period T of the data. In, for example, the case of a two-level data signal, applying the formula (8) results in the following expression for the error signals $e_0(n)$ to $e_3(n)$:

$$\begin{cases} e_0(n) = r(4n) - r(4n - 4) \cdot Sgn[r(4n)] \cdot Sgn[r(4n - 4)] \\ e_1(n) = r(4n - 1) - r(4n - 5) \cdot Sgn[r(4n - 1)] \cdot Sgn[r(4n - 5)] \\ e_2(n) = r(4n - 2) - r(4n - 6) \cdot Sgn[r(4n - 2)] \cdot Sgn[r(4n - 6)] \\ e_3(n) = r(4n - 3) - r(4n - 7) \cdot Sgn[r(4n - 3)] \cdot Sgn[r(4n - 8)] \end{cases} \quad (20)$$

The echo canceller shown in FIG. 7 formed by four transversal filters 51-0 to 51-3 whose coefficients are adjusted in accordance with the recursion formulae of the type of formula (4), while utilizing the error signals $e_0(n)$ to $e_3(n)$ formed in accordance with the formula (20), behaves as if it were formed from 4 echo sub-cancellers, each one of which has a function identical to the functions shown in FIG. 1 and independent of the mode of operation of the other echo subcancellers. The convergence of these 4 echo sub-cancellers is obtained under the same conditions as the echo canceller shown in FIG. 1. In these echo sub-cancellers, the signals Sgn[$e_0(n)$], Sgn[$e_1(n)$], Sgn[$e_2(n)$] and Sgn[$e_3(n)$] formed at instants determined by the clock signals $H_0$, $H_1$, $H_2$ and $H_3$, respectively, can be used to adjust the coefficients of the filters 51-0, 51-1, 51-2 and 51-3. These signals may be formed each in accordance with the circuit diagram shown in FIG. 4. It is alternatively possible to use, for adjusting the coefficients of the filters 51-0 to 51-3, the variant of the invention consisting in the use of the signals $E_0(n)$ to $E_3(n)$ formed from the signals Sgn[$e_0(n)$] to Sgn[$e_3(n)$] and from the signals Sgn[$r_0(n)$] to Sgn[$r_3(n)$] obtained by sampling the signal Sgn r(t) at instants determined by the clock signals $H_0$ to $H_3$. The signals $E_0(n)$ to $E_3(n)$ can each be formed in accordance with the circuit diagram of FIG. 6.

It should be noted here that the wholly independent operation of the 4 echo sub-cancellers of FIG. 7 is the result of the fact that in each error signal $e_0(n)$ to $e_3(n)$, used for the adjustment of the filter coefficients and formed in accordance with formulae (20), two values of the difference signal r(t) are utilized which are taken at instants separated by the period T of the data and which are independent as the data are independent. If these two values of the difference signal are separated by a fraction of the period T, they are not always indpendent and the operation of the 4 echo sub-cancellers is not independent anymore. Nevertheless, it has been observed for certain codes, such as the biphase code, that the assembly formed by 4 echo sub-cancellers can converge in practice, by using, for example, two values of the difference signal r(t) taken at instants separated by T/2.

What is claimed is:

1. An echo canceller used in a data transmission modem having a transmit and receive path for cancelling an echo signal in said receive path produced by a data signal in said transmit path comprising:

means for generating an echo copy signal at a frequency FE at least equal to a frequency of the data in the transmit path, including a digital processing circuit connected to said transmit path comprising at least one transversal filter operative at a sampling frequency, and having coefficients which are adjustable to minimize a predetermined function of an error signal corresponding to each filter;

a difference circuit connected to receive signals from said receive path and from said at least one transversal filter, whereby an error signal to be reduced by said at least one transversal filter is produced along with a data signal;

a decision circuit connected to said difference circuit for recovering said data signal;

means for modifying the coefficients of said at least one transversal filter comprising:

means for detecting the difference between a first signal at a first sampling instant and a second signal at a previous sampling instant from said difference circuit, said sampling instants separated in time by one sampling interval;

means for multiplying said first signal by the ratio of the data signal at said first sampling instant and at said previous sampling instant; and means for enabling the modification of said at least one transversal filter coefficients in dependence on whether said data signal at said first and previous sampling instants differ from zero and disabling said modification when one of said data signals equals zero.

2. An echo canceller as claimed in claim 1, wherein the sampling instants of each transversal filter are separated by the period of the data signal or a fraction of said period.

3. An echo canceller as claimed in claim 2, wherein the coefficients of each transversal filter are adjusted such as to minimize the mean-square value of said error signal corresponding to each filter.

4. An echo canceller as claimed in claim 3, or 1, further comprising a control circuit for the coefficients of each transversal filter for iteratively adjusting each coefficient in accordance with the recursion formula:

$$C_i(n+1) = C_i(n) + \beta \cdot d(n-i) \cdot e(n)$$

$C_i(n)$ and $C_i(n+1)$ being the values of a coefficient $C_i$ at the iterations n and n+1;

$\beta$ being a coefficient less than 1;

$d(n-i)$ being a datum stored in the transversal filter and corresponding to the coefficient $C_i$; and $e(n)$ being said corresponding error signal.

5. An echo canceller as claimed in claim 3, or 1, which further comprises a control circuit for the coefficients of each transversal filter for iteratively adjusting each coefficient in accordance with the recursion formula:

$$C_i(n+1) = C_i(n) + \beta \cdot d(n-i) \cdot Sgn[2(n)]$$

$C_i(n)$ and $C_i(n+1)$ being the values of a coefficient $C_i$ at the iterations n and n+1;

$\beta$ being a coefficient less than 1;

$d(n-i)$ being a datum stored in each transversal filter and corresponding to the coefficient $C_i$; and $Sgn[e(n)]$ being a signal characterizing the sign of said corresponding error signal.

6. An echo canceller used in a data transmission modem having a transmit and receive path for cancelling an echo signal in said receive path produced by a data signal in said transmit path comprising:

means for generating an echo copy signal at a frequency FE at least equal to a frequency of the data in the transmit path including a digital processing circuit connected to said transmit path comprising at least one transversal filter operative at a sampling frequency, and having coefficients which are adjustable to minimize a predetermined function of an error signal corresponding to each filter;

a difference circuit connected to receive signals from said receive path and said echo recopy signal from said at least one transversal filter, whereby an error signal to be reduced by said at least one transversal filter is produced along with a data signal;

a decision circuit connected to said difference circuit for recovering said data signal, said decision circuit producing a data signal having a positive and negative level as a result of a received two level baseband data signal or three level baseband data signal produced by a pseudo-ternary encoding of two level data;

a calculating circuit for modifying the coefficients of said at least one transversal filter according to a control signal $Sgn[e(n)]$ as the sign of the difference or of the sum of the values of the output signal of the difference circuit at actual and previous sampling instants of said at least one transversal filter depending on whether the values of the recovered data signal at the actual sampling instant and at the previous sampling instant have the same or different signs.

7. An echo canceller as claimed in claim 3, or 6, which comprises a control circuit for the coefficients of each transversal filter for iteratively adjusting each coefficient in accordance with the recursion formula:

$$C_i(n+1) = C_i(n) + \beta \cdot d(n-i) \cdot E(n)$$

$C_i(n)$ and $C_i(n+1)$ being the values of coefficient $C_i$ at the iterations n and n+1;

$\beta$ being a coefficient less than 1;

$d(n-i)$ being a datum stored in each transversal filter and corresponding to the coefficient $C_i$; and $E(n)$ being a signal having the value zero when the sign of the corresponding error signal characterized by $Sgn[e(n)]$ and the sign of the output signal of the difference circuit are different, and the value +1 or −1 when these two signs are simultaneously positive or negative.

8. An echo canceller as claimed in claim 6, wherein said calculating circuit comprises two sample-and-hold circuits connected in cascade activated by two complementary clock signals having the sampling frequency of the filter, the output signal of the difference circuit being applid to the input of said cascade circuit and to one input of two comparator circuits, the output signal of said cascade circuit being applied to the other input of one of said comparator circuits and, through an inverter amplifier, to the other input of the other comparator circuit, said comparator circuits forming the signals $\Delta(n)$ and $\Sigma(n)$, respectively, which characterize the sign of the difference and of the sum of the values of the output signal of the difference circuit at the actual sampling instant of the filter and at a previous sampling instant.

9. An echo canceller as claimed in claim 8, wherein said calculating circuit comprises a third comparator circuit for forming the sign of the output signal of the difference circuit, an Exclusive-OR gate one input of which receives the output signal of said third comparator circuit and the other input receives the input signal of a bistable trigger circuit sampling the output signal of said third comparator circuit at the sampling frequency of the filter, said Exclusive-OR gate supplying a signal $C(n)$ characterizing the product of the signs of said recovered data at the actual sampling instant of the filter and at a previous sampling instant.

10. An echo canceller as claimed in claim 9, wherein the signals $\Delta(n)$, $\Sigma(n)$, $C(n)$ are applied to bistable trigger circuits for being sampled at the sampling frequency of the filter, the samples of the signals $\Delta(n)$ and $\Sigma(n)$ being applied to a switch controlled by the samples of the signal $C(n)$ for forming the signal $Sgn[e(n)]$ by the samples of the signal $\Delta(n)$ or of the signal $\Sigma(n)$.

11. An echo canceller as claimed in claim 10 wherein said calculating circuit comprises a logic circuit for forming from the signal $Sgn[e(n)]$ supplied by said switch and from the output signal of said third comparator circuit a signal $E(n)$ having the value zero when the signs of a said switch and a third comparator output signal are different, and the value $+1$ or $-1$ when said signals are simultaneously positive or negative.

* * * * *